Figure 1:
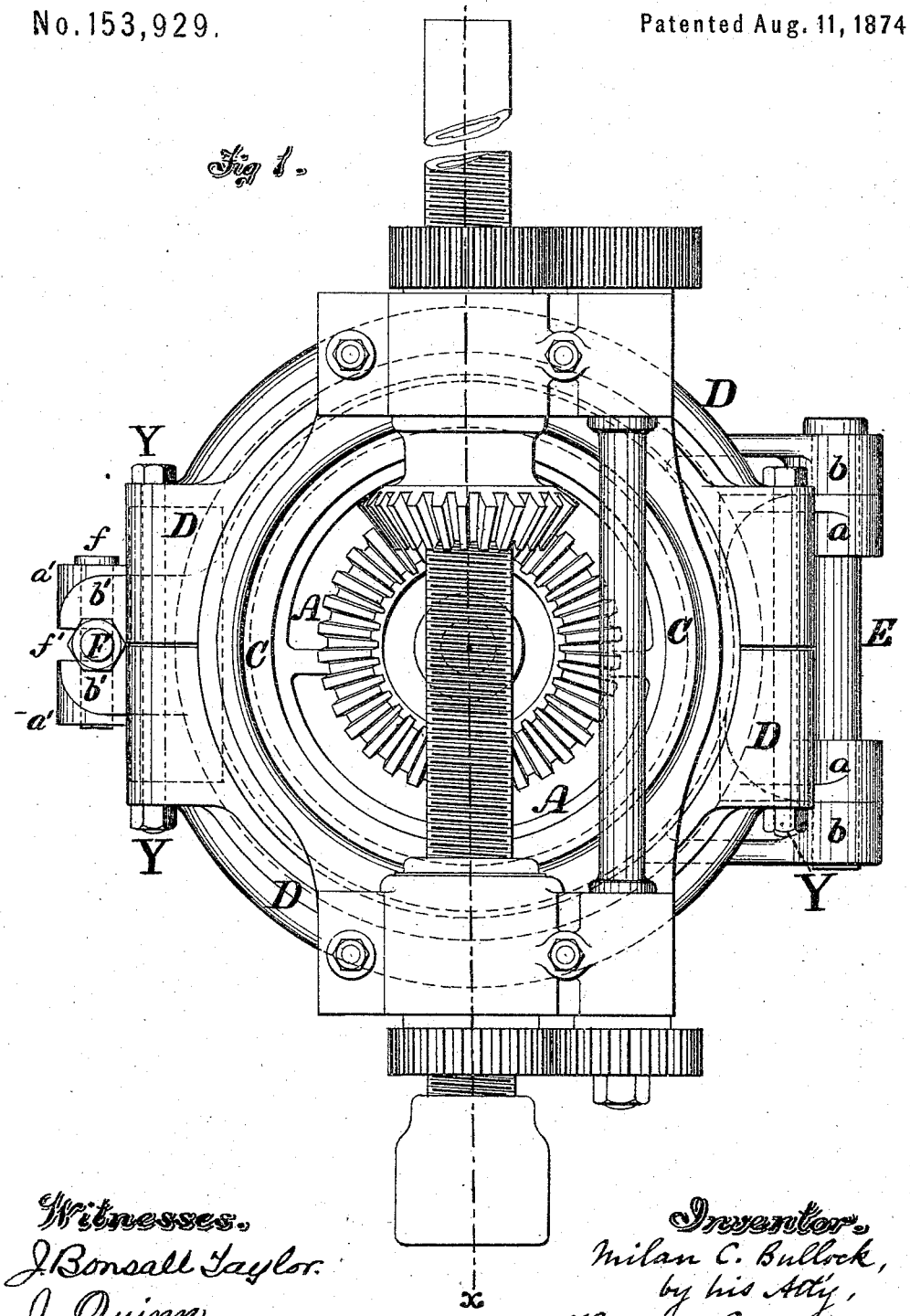

M. C. BULLOCK.
Swivel-Head Attachments for Rock-Drills.
No. 153,929. Patented Aug. 11, 1874.

2 Sheets--Sheet 1.

Witnesses:
J. Bonsall Taylor.
J. Quinn.

Inventor:
Milan C. Bullock,
by his Atty,
Horace Binney, 3rd.

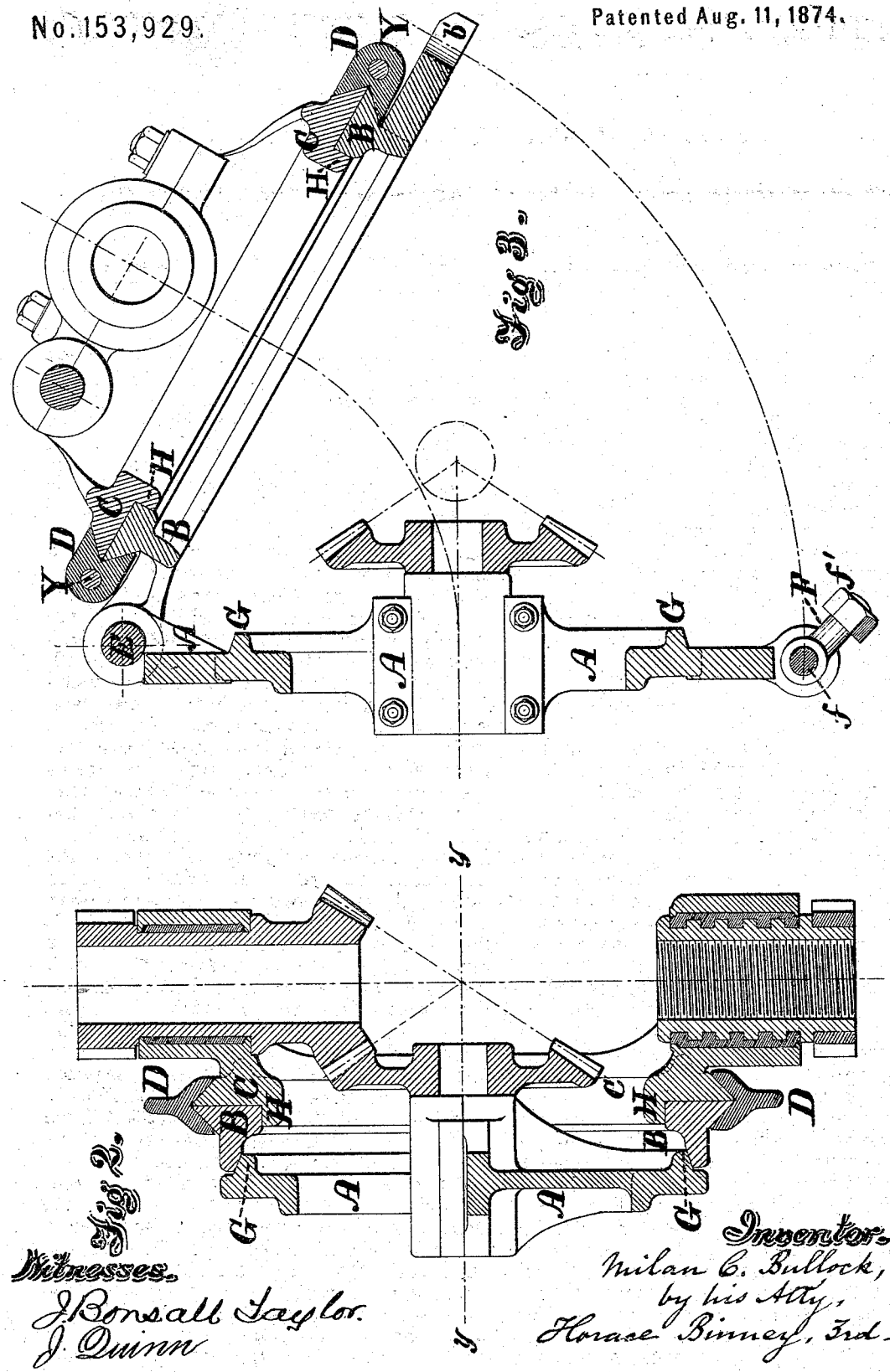

UNITED STATES PATENT OFFICE.

MILAN C. BULLOCK, OF NEW YORK, N. Y.

IMPROVEMENT IN SWIVEL-HEAD ATTACHMENTS FOR ROCK-DRILLS.

Specification forming part of Letters Patent No. 153,929, dated August 11, 1874; application filed January 31, 1874.

*To all whom it may concern:*

Be it known that I, MILAN C. BULLOCK, of the city, county, and State of New York, have invented a new and useful Improvement in Swivel-Head Attachments for Rock-Drilling Machines; and I do hereby declare the following to be a full, clear, and exact description thereof, which will enable others skilled in the art to which it appertains to make and use my invention, reference being had to the accompanying drawing, which forms a part of this specification, and in which—

Figure 1 is a front elevation of my improvement; Fig. 2, a vertical section thereof, taken on the line $x\,x$, Fig. 1; and Fig. 3, a horizontal section taken on the line $y\,y$, Fig. 2.

The same parts are denoted by the same letters in all the figures.

This invention relates to machinery for drilling and boring rock, and I have shown it as applied to the diamond drill. It consists in connecting the swivel-head, which carries the drill-rod, to the main frame of such apparatus by means of a hinge, thereby permitting the drill-rod, or sections thereof, to be withdrawn or replaced without removing the machine or detaching any part of it. It also consists in several combinations and novel constructions of parts, hereinafter described, for the purpose of transmitting the thrust of the drill to the main frame, relieving the connections from strain, and of changing or loosening the swivel-head by means of a single nut in changing the drilling angle.

A represents the front of the main frame, which supports the bevel driving-wheel, and, in the ordinary machine, the swivel-head. In this improvement it supports the annular swivel-head plate B, which is hinged to it by a pin, E, through lugs $a\,a$ and $b\,b$ on A and B, respectively. On the other side of A are two lugs, $a'\,a'$, through which passes a pin, $f$, and on this pin is hinged the bolt F. When the machine is in the position shown in Figs. 1 and 2 this bolt passes through an open slot in the piece $b'$, projecting from B, and the parts A and B are held together on one side by this bolt and its nut $f'$, which is screwed up tightly against $b'$, and on the other by the hinges already described. By loosening the nut $f'$, and throwing the hinged bolt F into the position shown in Fig. 3, so as to clear the nut from the piece $b'$, the plate B is left free to be swung into the position shown in that figure. There is an annular rib, G, on the frame A, turned off perfectly round and slightly tapering, which, when A and B are closed, as shown in Figs. 1 and 2, fits into an annular recess in B, bored or turned out to correspond exactly with it. C is the swivel-head, made with an annular rib, H, fitting exactly into the inner circumference of the plate B, so that the swivel-head, carrying the usual screw-shaft for the drill-rod, with bevel-pinion thereon, and the usual counter-shaft and feeding-gear, is supported on the annular plate B, to which it is secured by the annular clamp D D. This clamp is made in two pieces, fastened together by bolts and nuts Y Y, as shown in Fig. 1, and each of these pieces has an angular groove in its inner surface to receive the inclined faces of the swivel-head and plate.

In operation, the machine being in the position shown in Figs. 1 and 2, and the nuts Y Y being screwed up tightly, the thrust of the drill against the rock when boring is received through the swivel-head and rib H on the plate B, thereby relieving the clamp D D, and is then transmitted, through the rib G and its corresponding recess, to the frame A, so as to relieve the hinges and hinged bolt F. The entire thrust of the drill, or weight of the rod, as the case may be, is thus sustained by the frame. When the angle of drilling is to be changed, the operator loosens either one of the nuts Y Y, which permits the swivel-head to be turned on the plate B. Having adjusted the swivel-head in the desired position, he tightens the nut again, and the drilling proceeds.

When the drill-rod is to be withdrawn from the hole, the operator raises it in the usual manner until he can uncouple the joint below the chuck. After uncoupling he raises the upper section of the pipe clear of the lower, and tightens the chuck again. Next he loosens the nut $f'$ till he can throw the bolt F into the position shown in Fig. 3, after which he swings the plate B on its hinges into the position shown in said figure, thus leaving the front of the machine clear, and allowing free passage for the block and tackle, lifting-jack, &c.

What I claim as my invention, and desire to secure by Letters Patent of the United States, is—

1. The combination, substantially as described, of the main frame of a rock-drilling machine and a swivel attachment hinged thereto and supporting the drill-rod.

2. The combination, substantially as described, with the main frame of a rock-drilling machine and a swivel attachment hinged thereto and supporting the drill-rod, of the locking-bolt F.

3. The combination, substantially as described, of the frame A, constructed with a rib, G, and the correspondingly-recessed swivel-head plate B.

4. The combination, substantially as described, of the swivel-head plate B and ribbed swivel-head C.

5. The combination, substantially as described, of the plate B, swivel-head C, and clamp D D.

6. The combination of the main frame, swivel-head plate, swivel-head, and clamp, all arranged and operating substantially as shown and described.

M. C. BULLOCK.

Witnesses:
S. H. GARTLEY,
W. PARENT.